Nov. 26, 1935.  R. AVIGDOR  2,022,582
PRESSURE ADJUSTING DEVICE FOR PNEUMATIC TRANSMISSION OF MEASUREMENTS
Filed May 18, 1934
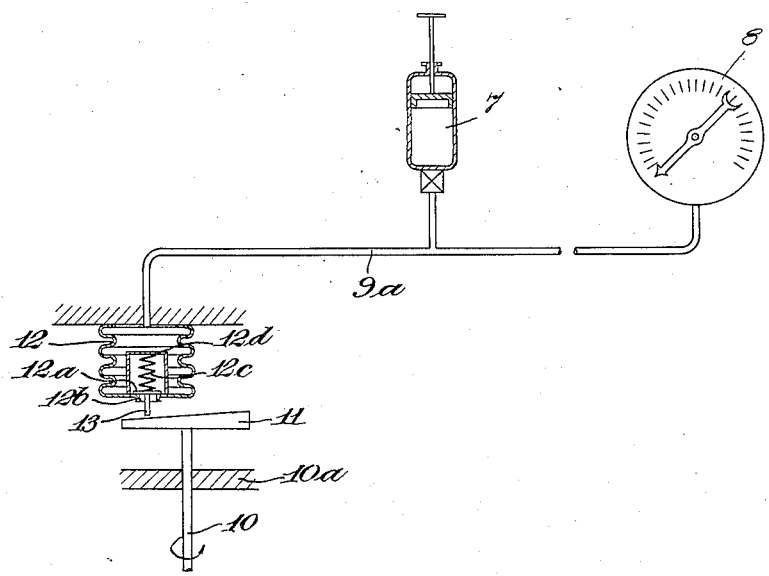
R. Avigdor
INVENTOR
By Marks & Clerk
ATTYS.

Patented Nov. 26, 1935

2,022,582

UNITED STATES PATENT OFFICE 2,022,582

PRESSURE ADJUSTING DEVICE FOR PNEUMATIC TRANSMISSION OF MEASUREMENTS

Rifat Avigdor, Berlin, Germany

Application May 18, 1934, Serial No. 726,367
In Germany March 14, 1933

2 Claims. (Cl. 73—54)

This invention relates to a device which makes it possible to transmit to distant points very small differences in length, height or pressure. The invention consists in this that by means of a source of compressed air, air is forced into the measuring conduit and the pressure produced is measured by a manometer. The regulation of this pressure is controlled directly or indirectly by a transmitting device. The construction of the pressure adjusting device is the subject matter of the invention.

In the accompanying drawing the figure shows one construction of the invention diagrammatically.

In the figure, the transmitting device is a plate 11 mounted on a shaft 10. The actual position of the plate 11 is determined by the adjusting device. This adjusting device consists of a bellows-like member 12 acting as a spring diaphragm. If the pump 7 is operated, compressed air is forced into the connecting conduit 9a between the manometer 8 and the member 12, which then extends until the feeling pin 13 of the blow off valve 12a touches the plate 11. When this occurs the blow off valve is moved in the cage 12d against the tension of the spring 12c and opens the passage 12b. The further the plate 11 is from the pin 13, the higher is the pressure which is required for extending the member 12 sufficiently for opening the valve. The manometer 8 indicates this pressure in the known manner.

The invention is especially suitable for determining the level of fuel in aircraft. In this case the plate 11 is arranged on the shaft 10 which is mounted in the tank wall 10a. The shaft 10 is actuated by a float which follows movements of the level of the liquid. The plate 11 adjusts itself in this manner with the float. If the hand pump is operated, the manometer indicates a certain value which corresponds to the level of the float. In this case the manometer is calibrated in litres.

What I claim is:

1. A measuring device with pneumatic transmission of measurement comprising a manometer and a source of compressed air connected therewith, a member variably displaceable in response to varying values, an extensible diaphragm connected with said source of compressed air, a blow-off valve mounted in said diaphragm, and a feeling pin carried by said valve and directly actuated by said member to open the valve when said diaphragm has moved from its position of rest through the distance between said pin and said member.

2. A measuring device as claimed in claim 1 characterized by the provision of means normally tending to close said valve, said closing means being arranged internally of said diaphragm.

RIFAT AVIGDOR.